(12) United States Patent
Ramchandra et al.

(10) Patent No.: US 7,144,619 B2
(45) Date of Patent: Dec. 5, 2006

(54) METALLIZED PACKAGING FILMS

(76) Inventors: Naik Praful Ramchandra, A - 1/5, Bhosale Paradise, Range Hill Road, Shivaji Nagar, Pune 411020 (IN); Nair AJith Sashidharan, A - 4/7, G-Sector, Shree Vihar, Shree Nagari, Nigdi-Pune 411044 (IN); Bhandari Mohan Harakchand, C-11, Siddhartha, Abhiman Shree Society, Pashan Road, Pune 411 008 (IN); Bharadia Rahul, BB-21, Swapnashilpa, Next to Gandhi Lounge, Ganesh Nagar, Kothrud, Pune 411029 (IN); Tilak Ammanabrolu Balgangadhar, CA-6, Clarion Park, D.P. Road, Aundh, Pune 411007 (IN); Itkar Sachin Chandrashekhar, Plot No. 365, Sector No. 24, Nigdi Pradhikaran, Pune 411044 (IN)

( * ) Notice: Subject to any disclaimer, the term of this patent is extended or adjusted under 35 U.S.C. 154(b) by 381 days.

(21) Appl. No.: 10/771,913

(22) Filed: Feb. 3, 2004

(65) Prior Publication Data

US 2005/0170161 A1    Aug. 4, 2005

(51) Int. Cl.
*B32B 1/08* (2006.01)
*B32B 7/02* (2006.01)
*B32B 15/08* (2006.01)
*B32B 19/00* (2006.01)
*B32B 27/08* (2006.01)

(52) U.S. Cl. ............ 428/212; 428/35.2; 428/35.3; 428/35.4; 428/213; 428/461; 428/518; 428/702

(58) Field of Classification Search .......... 428/212, 428/213, 216, 220, 207, 344, 354, 35.2, 35.3, 428/35.4, 461, 518, 702
See application file for complete search history.

(56) References Cited

U.S. PATENT DOCUMENTS 5,426,141 A * 6/1995 Akao .............. 524/110
5,492,741 A * 2/1996 Akao et al. ........ 428/35.2

* cited by examiner

*Primary Examiner*—Rena Dye
*Assistant Examiner*—Lawrence D. Ferguson
(74) *Attorney, Agent, or Firm*—Charles A. Muserlian

(57) ABSTRACT

A multi-layer thermoformable, translucent pharmaceutical and food packaging film consisting of a core layer of 100 to 1000 microns thickness of food grade poly vinyl chloride [PVC], devoid of plasticizers having vinyl monomer less than 1 ppm and a global migration of additives less than 60 ppm; and a metallized layer of thickness 0.02 to 2 microns provided at least on one side of the said core layer and at least one 0 to 250 microns thick food and pharmaceutical grade polymeric layer provided at least on one side of the core layer.

19 Claims, No Drawings

METALLIZED PACKAGING FILMS

This invention relates to metallized packaging films.

Still further this invention relates to metallized packaging films for use in the packaging of food and pharmaceutical products.

Still particularly, this invention relates to a multi layer film having high to medium moisture barrier property.

Metallizing of polymeric films are per se known. Typically in the prior art films such as PET, [polyethylene terepthalate] PP [poly propylene], LDPE Low density polyethylene metallized films have been used for photosensitive and oxygen scavenging/oxygen barrier films for use at very low thickness (less than 100 microns).

Metallization on thin films are generally done by vaporizing aluminum in a vacuum chamber under very high vacuum. The aluminum vapor will be then condensed on to the film surface, which forms a thin aluminum layer (~0.4 microns).

Metallization imparts additional water vapor, gas and UV barrier properties to the film. These thin metallized films have generally not been used flexible packaging of food and cosmetic items.

The invention provides a film having a polymer/metallic combination, its position in the multi layered structure & the individual layer thickness that provide synergy to achieve optimum & coherent functional qualities in the final composite film & Metallizing effect on the thicker film by lamination of commonly available metallized thin films on regular 150–400 micron PVC films & various shades of metallized film by applying colored lacquer on the top of the metallized film. Each polymeric substance is known for its diverse physical characteristic properties & hence while forming a multi-layered structure, synergy of these properties is very important to impart cohesiveness to the final film. The properties like thermal stability, elongation characteristics, flexibility, yield, sealability, tensile, strength, impact resistance, gloss, transparency & the barrier properties are characteristics of individual polymer films. This property, in turn, influences the functional qualities packaging aesthetics, cost, protection level, sealing integrity etc. Hence selection of the composite layer position, its thickness all are very important to get functional properties for the composite film.

Poly vinyl chloride is a relatively inexpensive packaging material but has little use in the blister packaging of sensitive drugs because of its poor moisture barrier properties. Plain PVC has MVTR [moisture vapor transmission rate] of 3–4 g/m2/24 hr. Moreover the packing created by using normal PVC film can be copied easily by any manufacturer as it is cheaply available and therefore can counterfeited.

Again, manufacture of PVC film in the prior art involves the use of various additives such as mordents and accelerators and non-food grade plasticizers, which renders the PVC unsuitable for the pharmaceutical applications. For pharmaceutical use only food/pharmaceutical grade can be used. Also these prior art films cannot be thermoformed easily and hence cannot be applicable for blister packaging applications.

Plasticizers are substances added to plastic compounds to improve their flexibility, extensibility and process ability. It is characteristic of plasticizer substances that they lower the melting temperature, elastic modulus and second order transaction temperature of polymers but do not alter the chemical nature of the micro molecules. By varying the concentration of plasticizers one can vary the desirable application properties of polymers. Plasticizers can be classified as re primary plasticizers and secondary plasticizers.

Primary plasticizers are required to gel a polymer rapidly in the normal processing temperature range. Example: Monomeric Di and Tri esters, Di octyl Phthalate etc. Secondary plasticizers have lower gelatin capacity and limited compatibility with the polymers. Example: Petroleum derivatives consist of aliphatic, Aromatic or chlorinated Hydrocarbon.

Many polymers require high processing temperature and they may decompose at this temperature but on addition of certain stabilizers have very good heat resistance to prevent discoloration or decomposition of the polymeric material. Plasticizers also increases the flexibility of polymeric films material and impart good low temperature performance considerably, give good weathering resistance and improved chemical resistances thereby increasing the life of the PVC end products. However, there is possibility of leaching out i.e. Migration which is a non-compliance with food content regulations and Evaporation of plasticizers during processing. This obviated from the use of plasticizer containing PVC in the pharmaceutical and food industry.

Additives on the other hand are widely used in thermoplastic and thermosetting polymers to adjust the handling, processing the properties.

These materials are added to polymeric material to enhance or obtain specific desire properties and also some time to reduce the cost without compromising on properties.

Additives improve or modify the mechanical properties, increase the resistance to degradation during processing or application, improve the appearance of the product and improve the process ability and productivity.

Examples include: Mineral particles, Fibers, Pigments, 1,4 Benzenedicarboxylic acid, Calcium carbonate, Aluminum silicate, Fatty acids, Carbon black, Ethylene methyl acrylate co polymer, Adipate, Animani Oxide, 4,4-Isoprpylidenediphenol alkyli, Methylitin 2-mercaptoethyloleate sulfide, Phosphorus acid and Pentaerythritol and the like.

Use of additives and plasticizers result in polymeric film having certain heavy metals like lead, cadmium, mercury and hexavalent chromium being present. The level of Heavy metal in polymeric material is determined by means of Atomic Absorption Spectrophotometer. The level of the heavy metal in polymeric film should not be exceeding 100 PPM by weight. It is known that within the plastic layer particles tends to migrate. The migration of particles in plastic material, which contain additives or other processing aids, which can contaminate the ingredient and even harm the consumer of the product. Universally certain migration limits (10 mg/dm$^2$ or 60 ppm.) have been specified for the usage of plastic material for food & drug packaging. Regular PVC also contains some traces Vinyl Chloride Monomer (VCM), which is not polymerized and cannot be separated after the polymerization. For food/pharmaceutical grade PVC the VCM content level in the material should be below the 1 PPM. The level of VCM content in material is determined by means of Gas Chromatography using the headspace method.

Use of PVC metallized films is relatively unknown in the pharmaceutical or food industry.

The existing ultra barrier films of polymer or Aluminum based structures are not cost effective & hence are not always economically viable. The objective of this invention is to create an economically viable moisture barrier film for the protective packaging of moisture sensitive substances.

This invention teaches the metallization/or the usage of metallized food grade PVC film for pharmaceutical packaging particularly blister packaging applications.

Particularly, this invention relates to a high to medium barrier multi layer film structure as viable alternatives for high cost polymeric/aluminum structures.

Still particularly, this invention relates to a film having for use in the packaging of highly to medium moisture sensitive substances.

This invention envisages a film, which can become viable a alternative to the existing aluminum & polymeric structures.

The invention has for its object the creation of multi-layered films with thermoforming characteristics having at least two layers some of them being of different polymeric substances leading to a film with ultra high moisture barrier with excellent gas barrier property.

One of the objects of this invention is to provide a metallized pharmaceutical and food grade PVC based film.

Another object of this invention is to provide a metallized film with Vinyl Chloride monomer content less than 1 ppm and global migration of additives being less than 60 ppm.

Yet another objective is to create metallized surface thicker film by laminating the metallized thin film on a normal thicker polymer film.

Typically, the metallized film envisaged is of thickness above 100 microns.

In accordance with a preferred embodiment of this invention there is provided a thermoformable metallized film for pharmaceutical packaging which is preferably a high to medium barrier film for the protection of pharmaceutical solid dosage forms.

Another object of this invention is to provide a metallized blister-packaging film with translucent appearance, through which packed product is visible.

Another object is to provide a Metallized film for blister packaging so that an online NFD (non filled detection) system can be used on the complete packed system also. Conventional aluminum packaging is opaque and therefore is unsuitable for an NFD system in the packed condition.

Yet another object of this invention is to provide a metallized film, which provides an anti-counterfeit solution since the metallizing is not easily imitated by counterfeiters.

Yet another object of this invention is to provide a metallized film having better aesthetics and metallic luster and therefore create a brand identity.

Still another object of this invention is to provide a metallized film, which can be formed on both rotary, vacuum forming and flat, pressure forming thermoforming machines with high productivity.

Yet another object of this invention is to provide a metallized film, being in the nature of a multilayered film, which can be produced by either, keeping the metallized layer as a sandwich layer or as the surface layer.

Yet another object of this invention is to provide a metallized film having high barrier properties and an aesthetically better film at lower cost than conventional high barrier films by laminating normally available thin metallized films on regular thick films.

With this objective, a multi layered film essentially comprising at least 3 layers is developed which has the capacity to provide high to medium barrier against moisture.

The multi-layered film developed comprises of an inner layer (Layer coming in contact with the range substance which is packed) made up of Poly Vinyl Chloride (PVC) having a thickness range between 100 to 400 microns. This PVC film is coated with a fine metallic deposition, typically of aluminum in the range of 0.05 to 2 microns. The metal deposition in such thin layers results in a metallized film with enhanced moisture barrier properties with a loss of transparency of the film resulting in a metallized translucent film.

The product envisaged in accordance with this invention is a multi layer film based on metallized PVC having thickness above 100 micron and thin metallized films of PVC,CPP,PET or BOPP having thickness less than 100 micron is laminated in to PVC film of higher thickness. The metallized layer may have thickness varying from 0.02 to 2 microns.

Other layers on the film, typically one of them being a tie layer could be one or combination of Polyvinylidine chloride (PVdC) (from 0.01 micron to 100 microns); Olefins (LDPE, HDPE) (0.5 micron to 50 microns); Cyclic olefin copolymer (COC) (0.01 to 250 microns).

The packaging film is formed in two ways. In one method the core PVC surface is in contact with the packed material & also will be in contact with the enclosing (liding film/foil) with metallized film secured to subsequent polymeric layers by either lamination, coating or co-extrusion process preferably by using an adhesive tie layer of PVdC having thickness range between 0.01 micron to 100 micron. In the second type the metallized surface is exposed to the atmosphere with subsequent polymer coating done on the non-metallized side, which comes in contact with the material and the liding foil for blister packing application.

These composite films may typically be given a silicone coating for enhancing the barrier property.

In accordance with the process of this invention the metallization of the PVC film is done by vacuum deposition or sputtering process or electrolysis process. Additional layers of polymeric material such as olefins are applied by lamination process. The PVdC layer is formed by dispersion coating method. Lamination and coating could be done in either on the metallized side or non-metallized side of PVC.

The thickness of the PVDC determines the barrier properties. Mildly barrier to very barrier films are produced by coating 0 microns to 100 microns respectively. The flexibility and drawability of the film is improved by lamination of the film with LDPE. The basic strength of the film is, improved by using higher thickness PVC film for metallization. The opacity and barrier property of the film is improved by increasing the thickness of the metallic layer.

Examples of typical films in accordance with this invention are provided in following accompanying examples

EXAMPLE 1

An analgesic formulation in tablet dosage form was blister packed in a non-metallized uncoated 250 microns thick PVC film with 25 micron VMCH coated Aluminum as the liding foil. [type 1]

The same product was packed in a 250-micron metallized PVC film produced by vacuum deposition method with a 10 micron PVDC layer formed thereon by dispersion coating. A 25-micron VMCH coated Aluminum was used as the liding foil. [type 2]

Both the blister strips were kept for stability studies in a humidity chamber of 40° C. & 75% RH. Both the products were analyzed after 6 weeks and following observations were made.

Product packed in the non-metallized PVC exhibited the following:

The chemical assay of the product was reduced by 5%.
1. The hardness of the product went below the acceptable limit.
2. Product absorbed more than 6% of moisture.

3. The physical appearance of the product shown considerable changes

Product packed in the metallized PVC:
1. The chemical assay of the product remained very well within the acceptable limit.
2. Hardness of the product remained within the acceptable limit.
3. The moisture absorption by the tablets is less than 1%.
4. The physical appearance of the product does not show any noticeable change. Disintegration time is also within the limit.

EXAMPLE 2

One set of lozenges tablets was strip packed using 30 microns aluminum foil on both side and kept at humidity chamber at 25° C. & 65%. [type 3] Another set of lozenges tablets was blister packed in a multi-layered metallized film having metallized PVC film 300 micron thick in which metallization was done by vacuum deposition and 55 microns of PVdC coating was applied by dispersion coating. [type 4]

Both the samples were analyzed after 12 weeks of keeping in the stability studies chamber. It was observed that all the properties of the product packed in both the packing were well within the acceptable limits. The assay of all the ingredients did not show any significant reduction. The physical appearance and clarity of the film did not deviate noticeably from the original. Moisture absorption in both the cases was well within the acceptance limit.

EXAMPLE 3

One set of medium sensitive antibiotic formulation in capsule format is blister packed using the invented film of the following structure: Metallized PVC 200 microns with 5 microns of metallized layer. The film was further coated with LDPE 30 microns on the PVC non-metallized side. [type 5] The packaged product was kept for stability studies in the humidity chamber having the testing parameters of 40° C. & 75% Relative Humidity for 8 weeks. The product analysis after the stipulated period showed that the product remained stable and all the physical and chemical properties were within the acceptable range.

EXAMPLE 4

Another batch of same drug of example 3 was placed in 0.5 micron thickness metal deposited 250 micron PVC with polyethylene coating of 25 microns. [type 6] The packaged product was kept for stability studies in the humidity chamber having the testing parameters of 40° C. & 75% Relative Humidity for 8 weeks. The product analysis after the stipulated period showed that the product remained stable and all the physical and chemical properties were within the acceptable range.

EXAMPLE 5

A set of Ethambutol hydrochloride formulation in tablet form is packed in PVC/Aclar of the following structures. PVC 250 microns Aclar 55 microns. [type 7] Another set of the same product from the same lot is packed in the film in accordance with this invention of the following structure. PVC 250 microns with a metallized layer formed thereon by sputtering an LDPE 30 micron formed on the PVC side by dispersion coating and a PVdC layer of 55 microns sandwiched between the PVC layer and the LDPE layer. [type 8] In both the case the liding foil was 25 micron Aluminum. Both the packaged products were kept in a humidity chamber maintained at 40° C. & 75% RH for 6 weeks. On analysis after the stipulated period it is observed that the product in both packages passed the stability testing showing all the stability parameters almost identical in nature and within the acceptance criteria. This shows that a muti-layer film of this invention can replace the expensive PVC/Aclar combination for very hygroscopic products and the film in accordance with this invention can provide required protection similar to very expensive Aclar films.

EXAMPLE 6

A set of highly sensitive multi vitamin capsules are packed simultaneously in a 30 microns (both side) strip packing [type 9] and in blister packing using a film having the following structure. PVC 300 microns, metallized layer of 1 micron, PVdC 65 microns [type 10]. Both the samples were kept for stability studies at 40° C. & 75% Relative Humidity. It was observed after 8 weeks of the study that the product packed in the invented film passed in all the testing parameters. Chemical assay was within the reach, physical appearance was same, and all other parameters are also is within the range. But in the case of the product packed in 30-micron aluminum strip, it was observed that intermittent samples showed considerable deterioration with major samples passing the acceptance criteria. The product also showed blackening in many of the areas. This shows the invented product is capable of protecting even highly sensitive product and can be saved from the inconsistent results seen in the 30 micron aluminum strip packing owing to pinholes present in the strip packs.

EXAMPLE 7

Capsules of herbal formulations were packed in the invented film having the following structure: PVC 200 microns, metallized layer 1 micron PVdC coating 23 microns on the metallized layer. [type 11] They were kept for stability studies at 40° C. & 75% Relative Humidity. After a period of 16 weeks these products were analyzed. The TLC (Thin layer chromatography) analysis showed that the products did not deteriorated at all. This proved that the invented film is capable protecting even very sensitive herbal products.

EXAMPLE 8

Capsules of the herbal formulations of example 7 were packed in a film having the following structure: PVC 200 microns, metallized layer 1-micron PVdC coating 50 microns on the PVC side. [type 12] They were kept for stability studies at 40 degrees C. & 75% Relative Humidity After a period of 16 weeks these products were analyzed. The TLC (Thin layer chromatography) analysis showed that the products did not deteriorated at all. This proved that the invented film is capable protecting even very sensitive herbal products.

EXAMPLE 9

The set of Ethambutol hydrochloride formulation in tablet form of example 5 were packed in the film in accordance with this invention of the following structure. PVC 250 microns with a metallized layer formed thereon by vacuum deposition of 1 micron a PE 30 microns formed on the PVC side by dispersion coating and a PVdC layer of 55 microns formed over the PE layer. [type 13] The liding foil was 25 micron Aluminum. The packaged product was kept in a humidity chamber maintained at 40° C. & 75% Relative Humidity for 6 weeks. On analysis after the stipulated period it is observed that the product in both packages passed the stability testing showing all the stability parameters within the acceptance criteria.

EXAMPLE 10

Capsules of herbal formulations were packed in the invented film having the following structure: PVC 250 microns, metallized layer 1-micron PVdC coating 23 microns on the PVC side. [type 14] The color agent sunset yellow was added to the metallized layer. The film was thermoformed to have multiple blisters. The capsules were clearly visible through the metallized layer and empty blisters were detectable in the NFD testing apparatus. The packed products were kept for stability studies at 40° C. & 75% Relative Humidity. After a period of 16 weeks these products were analyzed. The TLC (Thin layer chromatography) analysis showed that the products did not deteriorated at all. This proved that the invented film is capable protecting even very sensitive herbal products.

EXAMPLE 11

Capsules of herbal formulations of example 10 were packed in the invented film having the following structure: PVC 200 microns, metallized layer 1-micron PVdC coating 23 microns on the PVC side. The color agent sunset yellow was added to the metallized layer. A silicone coating was applied to the metallized layer. [type 15] The film was thermoformed to have multiple blisters. The capsules were clearly visible through the metallized layer and empty blisters were detectable in the NFD testing apparatus. The packed products were kept for stability studies at 40° C. & 75% Relative Humidity. After a period of 16 weeks these products were analyzed. The TLC (Thin layer chromatography) analysis showed that the products did not deteriorated at all. The silicone layer also preserved the aesthetic appearance of the packages.

EXAMPLE 12

A set of Penicillin tablets were packed in the film in accordance with this invention of the following structure: PVC 250 micron, 55 microns PVdC coated film was laminated on one side of the PVC film, with 30 micron pre-metallized PVC aluminum{0.5 microns} composite film by dry lamination method [type 16]. The liding foil was 25 micron Aluminum. The packaged product was kept in a humidity chamber maintained at 40° C. & 75% Relative Humidity for 12 weeks. On analysis after the stipulated period it is observed that the product in both packages passed the stability testing showing all the stability parameters within the acceptance criteria.

EXAMPLE 13

A set of Penicillin tablets were packed in the film in accordance with this invention of the following structure: PVC 250 micron, 55 microns PVdC coated film is laminated on the PVC on one side, 30 microns cast polypropylene pre-metallized film is provided by dry lamination method [type 17]. The liding foil was 25-micron heat seal lacquered Aluminum. The packaged product was kept in a humidity chamber maintained at 40° C. & 75% Relative Humidity for 12 weeks. On analysis after the stipulated period it is observed that the product in the package passed the stability testing showing all the stability parameters within the acceptance criteria.

EXAMPLE 14

A batch of sulphamethoxazole tablets was packed in the film in accordance with this invention of the following structure: PVC 200 micron, 35 micron PVdC on one side, 1 micron metal on the other and 3 microns of copper lacquer on the metal layer. The liding foil was 25-micron heat seal lacquered Aluminum. The packaged product was kept in a humidity chamber maintained at 40° C. & 75% Relative Humidity for 12 weeks. On analysis after the stipulated period it is observed that the product passed the stability testing showing all the stability parameters within the acceptance criteria.

All the films in the aforesaid examples were tested for water vapor transmission rate (WVTR). The WVTR is given in TABLE 1.

Water vapor transmission rate is measured as follows:

Water vapor transmission rate is the measure of the permeability of water vapor through the film/package under specified conditions of temperature & humidity and is denoted in gm/(m$^2$. 24 hr.) at 38° C. & 90% RH. Moisture barrier property and pack integrity of packaging can best be determined with accurate WVTR measurement. Optimum packaging selection, protection level of composite designs, package configuration, closure efficiency of seal/cap design & shelf life prediction of the packed product at various climatic conditions all can be accurately carried out with precise measurement of WVTR. The testing is done using MOCON Permetan WVTR measuring instrument. The moisture which permeates through the film is carried by the carrier gas and analysed by the IR modulated detector giving accurate and fast results of WVTR.

TABLE 1

| Type of film | WVTR (g/m2/d) |
| --- | --- |
| Type 1 | 3.46 |
| Type 2 | 0.75 |
| Type 3 | 0.09 |
| Type 4 | 0.18 |
| Type 5 | 0.40 |
| Type 6 | 0.45 |
| Type 7 | 0.11 |
| Type 8 | 0.16 |
| Type 9 | 0.05 |
| Type 10 | 0.10 |
| Type 11 | 0.52 |
| Type 12 | 0.21 |
| Type 13 | 0.15 |
| Type 14 | 0.48 |
| Type 15 | 0.42 |
| Type 16 | 0.16 |
| Type 17 | 0.14 |
| Type 18 | 0.19 |

The invention claimed is:

1. A multi-layer thermoformable, translucent film for pharmaceutical and food packaging comprising a core layer of 100 to 1000 microns thickness of food grade polyvinyl chloride, devoid of plasticizers and having vinyl chloride monomer less than 1 ppm and a global migration of additives less than 60 ppm; provided at least on one side of the core layer with a metallized layer of a thickness of 0.02 to 2 microns and at least one to 250 microns thick of a food and pharmaceutical grade polymeric layer provided at least on one side of the core layer.

2. A multi-layer thermoformable, translucent film for pharmaceutical and food packaging of claim 1, in which the polymeric layer is provided on the polyvinyl chloride core layer non metallized side.

3. A multi-layer thermoformable, translucent film for pharmaceutical and food packaging as claimed in claim 1, in which the polymeric layer is provided on the polyvinyl chloride core layer metallized side.

4. A multi-layer thermoformable, translucent film for pharmaceutical and food packaging as claimed in claim 1, in which the metallized layer is formed on the core layer.

5. A multi-layer thermoformable, translucent film for pharmaceutical and food packaging as claimed in claim 1, in which the metallized layer is formed on the core layer by vacuum deposition.

6. A multi-layer thermoformable, translucent film for pharmaceutical and food packaging as claimed in claim 1, in which the metallized layer consists of aluminum.

7. A multi-layer thermoformable, translucent film for pharmaceutical and food packaging as claimed in claim 1, in which the polymeric layer is formed on the metallized layer.

8. A multi-layer thermoformable, translucent film for pharmaceutical and food packaging as claimed in claim 1, in which the polymeric layer is formed on the polyvinyl chloride core layer on the non metallized side.

9. A multi-layer thermoformable, translucent film for pharmaceutical and food packaging as claimed in claim 2, in which the polymeric layer is applied on the polyvinyl chloride core layer on the non metallized side.

10. A multi-layer thermoformable, translucent film for pharmaceutical and food packaging as claimed in claim 2, in which the polymer layer is a layer of polyvinylidine chloride of thickness from 0.01 micron to 100 microns.

11. A multi-layer thermoformable, translucent film for pharmaceutical and food packaging as claimed in claim 1, in which the metallized layer is a composite film with a thickness of 10 to 100 microns, comprising a polymeric layer and a metallized layer of thickness 0.02 to 1 micron, which composite film is laminated on the core layer.

12. A multi-layer thermoformable, translucent film for pharmaceutical and food packaging as claimed in claim 1, in which the metallized layer is a composite film with a thickness of 10 to 100 microns, comprising a polyvinyl chloride layer with a thickness 0.02 to 1 micron, which composite film is laminated on the core layer.

13. A multi-layer thermoformable, translucent film for pharmaceutical and food packaging as claimed in claim 1, in which the metallized layer is a composite film with a thickness of 10 to 100 microns, comprising a cast polypropylene layer and a metallized layer with a thickness 0.02 to 1 micron, which composite film is laminated on the core layer.

14. A multi-layer thermoformable, translucent film for pharmaceutical and food packaging as claimed in claim 2, in which the polymer layer is a layer of LDPE and HDPE with a thickness of 0.5 micron to 50 microns.

15. A multi-layer thermoformable, translucent film for pharmaceutical and food packaging as claimed in claim 2, in which the polymer layer is a layer of cyclic-olefin copolymer with a thickness of 0.01 to 250 microns.

16. A multi-layer thermoformable, translucent film for pharmaceutical and food packaging as claimed in claim 1, in which the at least one polymeric layer provided is laminated over the metallized layer using a tie layer of polyvinylidine chloride.

17. A multi-layer thermoformable, translucent film for pharmaceutical and food packaging as claimed in claim 1, in which the film is provided with a coating of silicone on at least one side of the film.

18. A multi-layer thermoformable, translucent film for pharmaceutical and food packaging as claimed in claim 1, which further includes at least one colored lacquer layer with a thickness of 0.02 to 50 microns.

19. A multi-layer thermoformable; translucent film as claimed in claim 1, in which the polymer layer is cast metallized polyvinyl chloride.

* * * * *